(12) United States Patent
Veneziani

(10) Patent No.: US 11,149,700 B2
(45) Date of Patent: Oct. 19, 2021

(54) AIR INTAKE DEVICE FOR A HEAT ENGINE

(71) Applicant: RENAULT s.a.s., Boulogne-Billancourt (FR)

(72) Inventor: Thomas Veneziani, Paris (FR)

(73) Assignee: RENAULT s.a.s., Boulogne-Billancourt (FR)

(*) Notice: Subject to any disclaimer, the term of this patent is extended or adjusted under 35 U.S.C. 154(b) by 0 days.

(21) Appl. No.: 16/761,384

(22) PCT Filed: Oct. 24, 2018

(86) PCT No.: PCT/EP2018/079167
§ 371 (c)(1),
(2) Date: May 4, 2020

(87) PCT Pub. No.: WO2019/091785
PCT Pub. Date: May 16, 2019

(65) Prior Publication Data
US 2020/0370520 A1   Nov. 26, 2020

(30) Foreign Application Priority Data

Nov. 8, 2017 (FR) ..................... 17 60459

(51) Int. Cl.
*F02M 35/10* (2006.01)
*F02M 35/104* (2006.01)

(52) U.S. Cl.
CPC .... *F02M 35/10288* (2013.01); *F02M 35/104* (2013.01); *F02M 35/10006* (2013.01);
(Continued)

(58) Field of Classification Search
CPC ....... F02M 35/10288; F02M 35/10078; F02M 35/10144; F02M 35/10321; F02M 35/104;
(Continued)

(56) References Cited

U.S. PATENT DOCUMENTS

| 5,094,194 A | 3/1992 | Rush, II et al. |
| 5,937,815 A | 8/1999 | Hidaka |

(Continued)

FOREIGN PATENT DOCUMENTS

| DE | 196 36 579 A1 | 3/1997 |
| DE | 198 12 844 A1 | 1/1999 |

(Continued)

OTHER PUBLICATIONS

International Search Report dated Nov. 23, 2018 in PCT/EP2018/079167 filed on Oct. 24, 2018, 4 pages.

*Primary Examiner* — Jacob M Amick
(74) *Attorney, Agent, or Firm* — Oblon, McClelland, Maier & Neustadt, L.L.P.

(57) ABSTRACT

An air intake circuit for a heat engine is intended to be positioned between an air compression element and at least an upper portion of a hollow combustion chamber in a cylinder head of the engine. The air intake circuit includes the cylinder head, an air intake manifold, and at least one air intake duct. The circuit also includes at least one concave receptacle turned towards the outside of the engine, housed in a cavity of the cylinder head, and connected to a tubular element pushed into the at least one air intake duct.

10 Claims, 2 Drawing Sheets

(52) U.S. Cl.
CPC .......................... *F02M 35/10078* (2013.01); *F02M 35/10144* (2013.01); *F02M 35/10321* (2013.01)

(58) Field of Classification Search
CPC ....... F02M 35/10006; F02M 35/10039; F02M 35/1211
See application file for complete search history.

(56) References Cited

U.S. PATENT DOCUMENTS

| | | |
|---|---|---|
| 6,026,774 A | 2/2000 | Kajihara et al. |
| 7,370,620 B1 | 5/2008 | Nino et al. |
| 2013/0167814 A1 | 7/2013 | Martins et al. |
| 2017/0226923 A1 | 8/2017 | Mull, Jr. et al. |
| 2018/0215251 A1* | 8/2018 | Esaki ................ F02M 35/00 |
| 2018/0347522 A1* | 12/2018 | Ooki ................ F02M 35/104 |

FOREIGN PATENT DOCUMENTS

| | | |
|---|---|---|
| DE | 10 2007 045 634 A1 | 4/2009 |
| EP | 0 867 610 A2 | 9/1998 |
| WO | WO 2011/120933 A1 | 10/2011 |

\* cited by examiner

AIR INTAKE DEVICE FOR A HEAT ENGINE

TECHNICAL FIELD OF THE INVENTION

The present invention relates to an air intake circuit for a heat engine or internal-combustion engine.

The invention also relates to a heat engine including such an air intake circuit.

Finally, the invention relates to a motor vehicle including such an air intake circuit or such a heat engine.

PRIOR ART

In order to comply with international emissions standards for spark-ignition engines, in particular petrol engines, motor vehicle manufacturers seek to optimize fuel combustion (petrol or Diesel) in the combustion chambers of the engine. For this purpose, the air intake circuit must comply with certain constraints: a controlled quantity of fresh air must be brought into each combustion chamber, while generating aerodynamic turbulence. The turbulence generated differs between spark-ignition engines and Diesel engines.

To improve the efficiency of the engine, it is known to integrate an air compression element into the air intake circuit of the engine in order to increase the pressure of the gases admitted and to improve the filling of the cylinders of the engine with air-fuel mixture, which results in an increase in power density of the engine and therefore increases the power or reduces the consumption of the engine. This compression element can be an electric compressor or a compressor of a turbocharger arranged between an air filter and an air intake manifold of an engine. The air is thus captured from a front face of the vehicle before passing through the filter, the compression element and an intake manifold, before going back into the engine via air intake ducts hollowed out of a cylinder head.

However, the intake air is heated after compression, which has a negative effect on engine efficiency.

To bring the fresh air into the engine, a heat exchanger is arranged in the air intake circuit between the compression element and the intake manifold of the engine to cool the compressed air that enters the combustion chambers.

In a known manner, the air collected in the air intake manifold is distributed to each combustion chamber via air intake ducts passing through the cylinder head of the engine, which enables the intake air flows into each cylinder of the engine to be controlled. The air intake manifold has a throttle valve housing, a volume of buffer air, also referred to as a plenum, and at least as many air intake ducts as cylinders. The air intake manifold can for example be a cast part or plastic part affixed to the cylinder head.

The intake manifold and the intake ducts are able to generate aerodynamic turbulence in the combustion chamber in order to ideally mix the petrol with the air to achieve efficient combustion. The geometry and orientation of the air intake ducts in relation to the combustion chamber play a key role in generating this aerodynamic turbulence.

In a known manner, the air intake manifold and the heat exchanger are fastened to the engine, notably to a wall of the cylinder head, which significantly increases the size of the engine.

Furthermore, reducing the weight of the engine is important with a view to reducing consumption and pollutant emissions, such as carbon monoxide. In order to reduce the mass of the cylinder head, it is known to incorporate elements of the air intake manifold into the cylinder head wall. Thus, said cylinder head wall can be a wall of the plenum of a manifold.

The publication U.S. Pat. No. 3,949,715-A discloses a cylinder head with a plenum of an air intake manifold. Said plenum is part of the cylinder head, which increases the volume, and consequently the weight, of the cylinder head.

The purpose of the invention is to provide an air intake circuit for a heat engine (petrol or Diesel) that overcomes the aforementioned drawbacks and improves the air intake circuits for heat engines known in the prior art.

Presentation of the Invention

In particular, the invention provides an air intake circuit for a heat engine including such an air intake circuit that is compact, easy to assemble and maintain, while minimizing the weight of said circuit, optimizing air circulation and helping to reduce pressure drops in the air flows.

More specifically, the invention relates to an air intake circuit for a heat engine, said air intake circuit being intended to be positioned between an air compression element and at least an upper portion of a combustion chamber hollowed out of a cylinder head of the engine, said air intake circuit comprising the cylinder head, an air intake manifold and at least one air intake duct,
characterized in that the circuit comprises at least one concave receptacle turned towards the outside of the engine that is seated in a cavity of the cylinder head and connected to a tubular element pushed into the at least one air intake duct.

Advantageously, the receptacle and the tubular element form a device for directing the intake air directly into the intake ducts hollowed out of the cylinder head. This obviates the need for a complex cylinder head and notably for the cavity in said cylinder head for collecting and directing the air flows towards the intake ducts of the cylinder head.

According to other features of the invention:
the receptacle is surrounded by a radial rim designed to bear against a fastening wall of the cylinder head.

Advantageously, the radial rim provides a fastening point between the receptacle and the cylinder head.
the tubular element connected to the receptacle is conical.

Advantageously, the tubular element connected to the receptacle is conical to enable acceleration of the intake air flow at the inlet thereof to the combustion chamber.
the receptacle has a deflecting wall that is designed to direct an air flow towards an opening connected to the tubular element.

Advantageously, the receptacle has a deflecting wall designed to direct an air flow towards an opening connected to the tubular element, and the shape thereof is therefore optimized to direct the intake air flow.
the wall of the tubular element has an annular channel that faces the at least one air intake duct and is designed to accommodate a sealing gasket.

Advantageously, the tubular element has a sealing gasket to prevent the intake air from flowing back into the cavities in the cylinder head.
the radial rim of the receptacle has a sealing element facing the fastening wall of the cylinder head.
the sealing element is in a list including a lip running around the edge of the rim and a sealing gasket seated between the radial rim and the fastening wall of the cylinder head.

Advantageously, the radial rim of the receptacle has a sealing element facing the cylinder head.

the receptacle is made of plastic.

Advantageously, the receptacle is made of plastic, which helps to reduce weight.

the receptacle is separated from the wall of the cavity of the cylinder head.

Advantageously, the receptacle is separated from the wall of the cavity of the cylinder head, and the § space in the cavity is therefore greater than the volume of the receptacle. The space hollowed out of the cylinder head to form the cavity can then be optimized to substantially reduce weight.

the receptacle, the radial rim and the tubular element form a single part.

Advantageously, the receptacle, the radial rim and the tubular element form a single part, which facilitates manufacture while helping to improve the rigidity of the whole.

the manifold has a downstream outlet surrounded radially by a fastening ledge designed to bear against the radial rim of the receptacle and the fastening wall of the cylinder head.

Advantageously, the radial rim is designed to optimize the join between the manifold and the cylinder head.

the radial rim, the receptacle and the tubular element are parts of the air intake manifold.

Advantageously, the radial rim, the receptacle and the tubular element are parts of the air intake manifold, which helps to reduce the number of parts in references and the number of actions required to assemble the air intake circuit.

SHORT DESCRIPTION OF THE FIGURES

Other advantages and characteristics of the invention are set out in the following description of specific embodiments of the invention, which are provided as non-limiting examples and are shown on the attached drawings, in which.

DETAILED DESCRIPTION OF THE FIGURES

In the description below, identical reference signs refer to identical parts or parts having similar functions.

Figure 1:
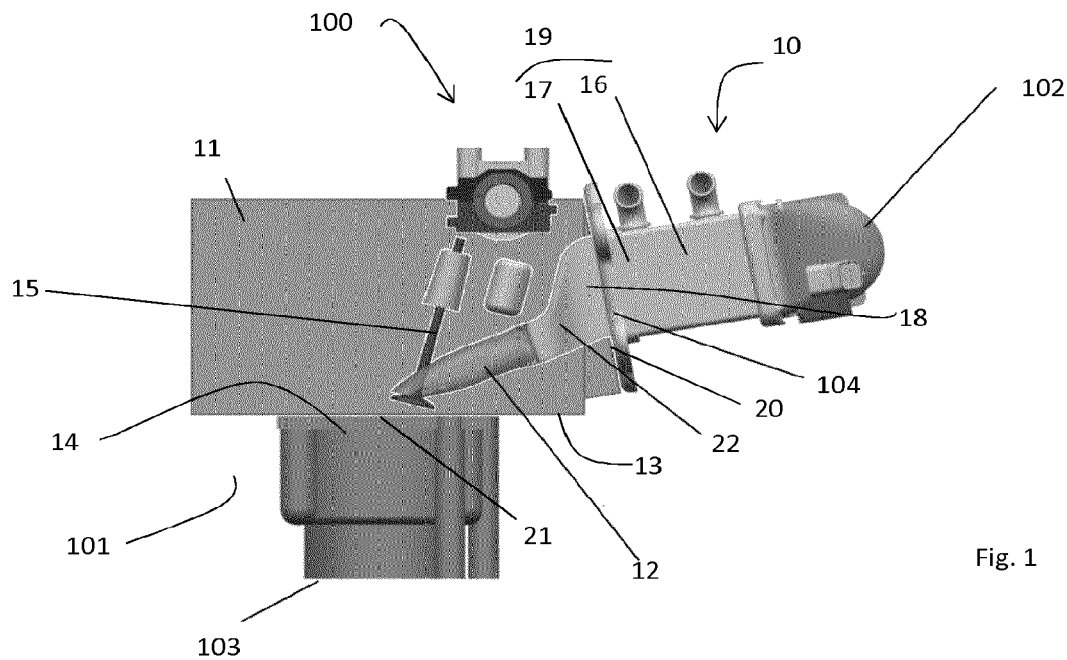
FIG. 1 is a longitudinal schematic view of a cross section of an air intake circuit.

As shown schematically in FIG. 1, motor vehicles can be fitted with an internal-combustion or heat engine 100. The heat engine usually has a cylinder head mounted on a cylinder block 101, also referred to as an engine block. The engine also has an air intake circuit 10 through which air enters the combustion chambers 14 of the engine from the outside.

The air is captured from a front face of the vehicle and passes through the intake circuit before being injected into the combustion chambers. To improve engine performance, it is known to increase the pressure of the gases admitted and to improve the filling of the cylinders of the engine with air-fuel mixture. This increases the power density and power of the engine while reducing the consumption of the engine. An intake air compression stage is therefore arranged between an air filter and the engine. This compression stage is formed either by the compression portion of a turbocharger or by an electric compressor. FIG. 1 shows an upstream connection cone 102 between the compression stage (not shown) and the air intake circuit 10.

The compressed air is then at a high temperature and the mass density thereof is reduced, which has a negative effect on engine performance. It is therefore useful to add an air cooling stage downstream of the compressor, in the direction of air flow. This cooling stage can comprise a cooler 16 and more specifically an air/water exchanger. The water at a moderate temperature passes through the exchanger and takes away some of the heat from the compressed air.

The air is then directed towards an air intake manifold 17 to control the air flow admitted into the combustion chambers 14. The manifold is fastened by a flange 104 to a fastening wall 20 of the cylinder head of the engine and directs the compressed cooled air towards the air intake ducts 12 hollowed out of the cylinder head. Said intake ducts in the cylinder head have a specific shape and profile depending on the type of engine, for example Diesel or spark ignition.

The intake circuit 10 is arranged between a compressor (not shown) and the engine 100, which includes a cylinder block 101 mounted on the cylinder head 11. The cylinders 103 containing the pistons are arranged inside the cylinder block. Said pistons slide in a to-and-fro movement along the axis of the cylinder.

A combustion chamber is provided for each of the cylinders, formed by the cylinder, the piston and a bottom wall 13 of the cylinder head. The intake ducts 12, the openings of which to each of the combustion chambers 14 are blocked by controlled valves 15, open out into said bottom wall of the cylinder head.

Figure 2:
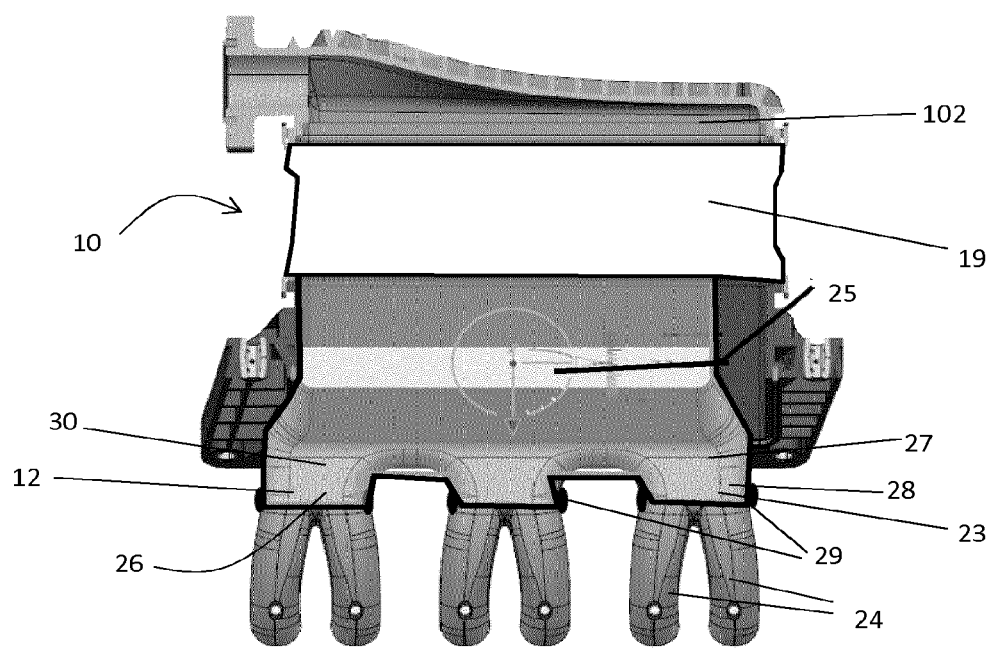
FIG. 2 is a schematic top cross-section view of the air intake circuit according to the invention.
Figure 3:
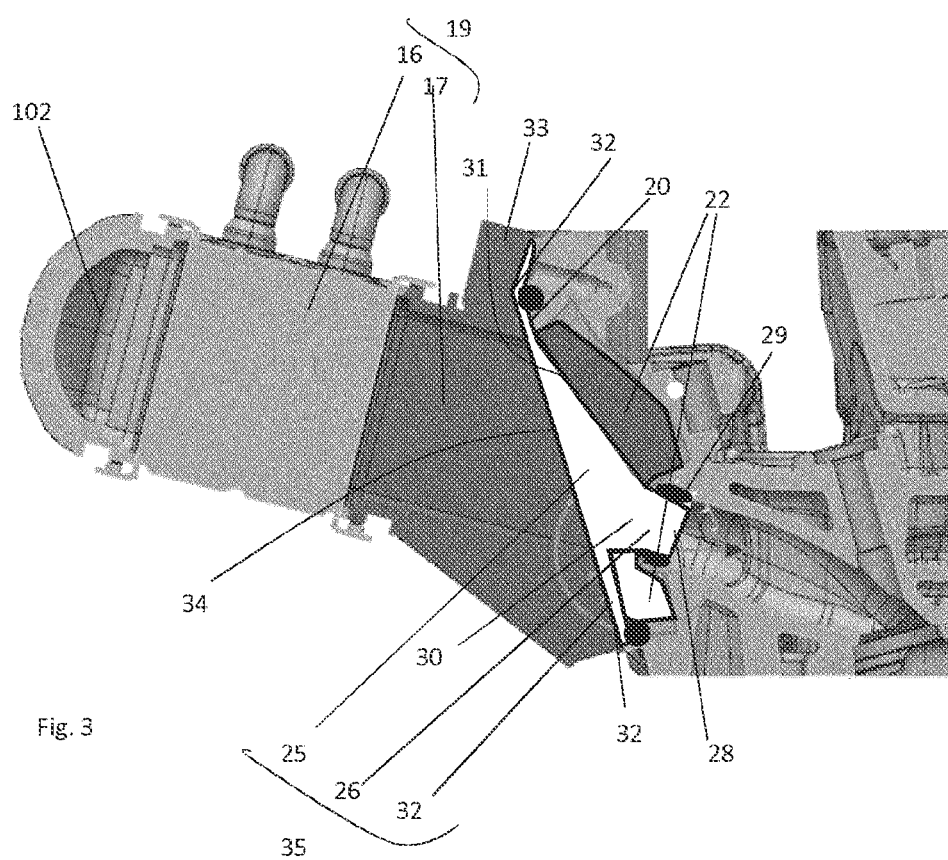
FIG. 3 is a schematic longitudinal cross-section view of the air intake circuit according to the invention.

As shown in FIGS. 1 to 3, the cooler 16 and the air intake manifold 17 form a single part 19. The cooler is also referred to as the water charge-air cooler (WCAC). The manifold is essentially distinguished by a plenum or reserve air chamber before the inlet to the intake ducts 12 of the cylinder head. In the present embodiment, the manifold is downstream of the exchanger and shares the same housing. Said housing is fastened directly to a fastening wall of the cylinder head. Said fastening wall 20 lies in a plane and is inclined in relation to a horizontal plane represented for example by a join plane 21 between the cylinder head and the cylinder block. Said incline facilitates installation of the cooler and makes maintenance more reliable.

The description below refers to one cylinder to facilitate comprehension, but the engine according to the invention has at least one cylinder.

According to the two figures, the cylinder head 11 has a cavity 22 into which a primary air intake duct 23 opens. This primary duct is extended by two secondary ducts 24 that carry the intake air in two different directions in the combustion chamber to obtain the desired swirl or tumble effect depending on the type of engine (Diesel or petrol).

The cavity 22 is obtained by molding and the surface condition of the wall of the cavity is of little importance. Advantageously, the cylinder head is hollowed out as much as possible in consideration of the mechanical rigidity stresses of the cylinder head about the opening of the first inlet duct 23.

A receptacle 25 is placed in the cavity. The receptacle is basin-shaped and has a curvature oriented towards the outside of the engine and towards the manifold when the manifold is mounted against the fastening wall of the cylinder head.

The receptacle 25 has an opening 30 connected to a substantially tubular element 26. Said tubular element enables the intake air to be directed into the primary intake duct 23 of the cylinder head 11. Said tubular element is substantially conical with a reduction of the flow area from the upstream end 25 to the downstream end 28 to accelerate the intake air. The external section of the downstream end 28 of this tubular element substantially matches the flow area of the primary duct 23, within assembly clearance tolerances.

Preferably, the downstream end of the tubular element is surrounded by a sealing part between the downstream end 28 of the tubular element 26 and the primary intake duct 23 of the cylinder head, to prevent air from flowing back towards the cavity 22 of the cylinder head. This part can be a sealing lip. Preferably and in the embodiment shown in FIG. 2, this sealing part is a ring seal 29 seated in an annular channel (not shown) facing the wall of the primary duct 23 of the cylinder head and surrounding the downstream end 28 of the tubular element. The ring seal 29 is made of an elastomer and has elastic and shock-absorbing properties.

The receptacle 25 has a deflecting wall 31 that is designed to direct the intake air towards the opening 30 connected to the tubular element 26. The deflecting wall 31, as shown in FIG. 3, is for example flat and inclined in relation to the horizontal plane 21 in order to direct the intake air towards the lower portion of the receptacle, where the opening 30 is arranged once the receptacle has been mounted on the cylinder head.

The receptacle 25 is surrounded by a rim 32 or fastening ledge extending radially and designed to bear against the fastening wall 20 of the cylinder head 11. Said rim 32 lies in a bearing plane 34.

Advantageously, the volume delimited by the receptacle 25 and the bearing plane 34 is less than the volume delimited by the cavity 22 and the plane of the fastening wall 20 of the cylinder head. Consequently, the wall of the receptacle 25 is separated from the wall of the cavity 22 of the cylinder head once the receptacle has been mounted on the cylinder head. This also enables easy assembly of the receptacle with the tubular element in the cylinder head 11.

Preferably, said fastening rim includes a sealing element facing the fastening wall 20 of the cylinder head. Said sealing element is in a list including a lip running around the edge of the rim and a sealing gasket seated between the rim and the plane of the fastening wall 20 of the cylinder head.

Preferably, the fastening rim is designed to fit the perimeter of the intake air manifold. Indeed, the manifold 17 has a downstream air outlet surrounded by a fastening ledge 33 that is designed to bear against the fastening rim 32 and against the fastening wall 20 of the cylinder head 11. Said fastening rim is then interposed between the air manifold 17 and the fastening wall 20 of the cylinder head 11. A sealing element is also arranged between the fastening rim 32 and the fastening ledge 33 of the manifold. Said sealing element can be in a list including a lip running around the edge of the rim and a sealing gasket seated between the rim and the fastening ledge 33 of the manifold.

Advantageously, the three elements (the fastening rim 32, the receptacle 25 and the tubular element 26) are formed as a single part obtained by molding plastic and form an interface part 35 between the manifold 17 and the cylinder head 11, resulting in a cylinder head that is lighter and simpler to manufacture.

Assembly of the interface includes the following steps:
placement of the ring seal 29 in the channel about the downstream end of the tubular element,
possible placement of the sealing gasket on the rim of the interface,
insertion of the tubular element into the primary duct 23,
pushing the receptacle 25 into the cavity 22 of the cylinder head until the rim 32 comes into bearing contact with the fastening wall 20 of the cylinder head,
placement of the air intake manifold in front of the interface, the downstream outlet of said manifold facing the receptacle 25,
fastening of the manifold to the cylinder head, the fastening ledge 33 of the manifold then bearing against the edge of the interface part 35.

Once assembled, the interface part 25 enables the intake air flow coming from the manifold 17 to be directed towards the primary duct 23 of the cylinder head. The rings seal 29 firstly guarantees that the air does not flow back into the cavity 22 of the cylinder head, and secondly absorbs the vibrations caused by passage of the air.

The objective is achieved: the interface part 35 provides a cylinder head 11 that is simple to manufacture and more lightweight.

Naturally, the invention is not limited solely to the embodiments described herein, described above by way of an example, but includes all possible variants.

The invention claimed is:

1. An air intake circuit for a heat engine, said air intake circuit being configured to be positioned between an air compression element and at least an upper portion of a combustion chamber hollowed out of a cylinder head of the engine, said air intake circuit comprising:
the cylinder head;
an air intake manifold;
at least one air intake duct; and
at least one concave receptacle that is turned towards the outside of the engine, seated in a cavity of the cylinder head and connected to a tubular element directly connected to the at least one air intake duct,
wherein the cavity of the cylinder head is upstream from the at least one air intake duct; and
wherein the receptacle is separated from a wall of the cavity of the cylinder head.

2. The air intake circuit as claimed in claim 1, wherein the receptacle is surrounded by a radial rim configured to bear against a fastening wall of the cylinder head.

3. The air intake circuit as claimed in claim 1, wherein the tubular element connected to the receptacle is conical.

4. The air intake circuit as claimed in claim 1, wherein the receptacle has a deflecting wall that is designed to direct an air flow towards an opening connected to the tubular element.

5. The air intake circuit as claimed in claim 1, wherein a wall of the tubular element has an annular channel that faces the at least one air intake duct and includes a sealing gasket to sealing connect the tubular element and the at least one air intake duct to prevent air from flowing back towards the cavity.

6. The air intake circuit as claimed in claim 2, wherein the radial rim of the receptacle has a sealing element facing the fastening wall of the cylinder head.

7. The air intake circuit as claimed in claim 6, wherein the sealing element is at least one of a lip running around the edge of the rim and a sealing gasket seated between the radial rim and the fastening wall of the cylinder head.

8. The air intake circuit as claimed in claim 1, wherein the receptacle is made of plastic.

9. The air intake circuit as claimed in claim 2, wherein the receptacle, the radial rim, and the tubular element form a single part.

10. The air intake circuit as claimed in claim 2, wherein the manifold has a downstream outlet surrounded radially by a fastening ledge designed to bear against the radial rim of the receptacle and the fastening wall of the cylinder head.

\* \* \* \* \*